United States Patent [19]
Iwashita et al.

[11] Patent Number: 6,020,706
[45] Date of Patent: Feb. 1, 2000

[54] METHOD OF AND APPARATUS FOR CONTROLLING A SERVOMOTOR

[75] Inventors: Yasusuke Iwashita, Oshino-mura; Hiroyuki Kawamura, Minamitsuru-gun, both of Japan

[73] Assignee: Fanuc Ltd., Yamanashi, Japan

[21] Appl. No.: 09/043,635

[22] PCT Filed: Jul. 24, 1997

[86] PCT No.: PCT/JP97/02572

§ 371 Date: Mar. 24, 1998

§ 102(e) Date: Mar. 24, 1998

[87] PCT Pub. No.: WO98/03900

PCT Pub. Date: Jan. 29, 1998

[30] Foreign Application Priority Data

Jul. 24, 1996 [JP] Japan .................................. 8-214162

[51] Int. Cl.$^7$ .................................................. G05B 13/00
[52] U.S. Cl. .......................................... 318/561; 318/560
[58] Field of Search .................................... 318/254, 640, 318/560, 568.18, 432, 561, 616

[56] References Cited

U.S. PATENT DOCUMENTS

| | | | |
|---|---|---|---|
| 4,829,219 | 5/1989 | Penkar | 318/568.18 |
| 4,887,015 | 12/1989 | Kurakake et al. | . |
| 4,914,370 | 4/1990 | Sakamoto et al. | . |
| 4,925,312 | 5/1990 | Onaga et al. | 364/513 |
| 4,994,978 | 2/1991 | Kawamura et al. | 364/474.3 |
| 5,221,884 | 6/1993 | Teshima | 318/569 |
| 5,589,748 | 12/1996 | Kazama et al. | 318/560 |
| 5,691,615 | 11/1997 | Kato et al. | 318/609 |

FOREIGN PATENT DOCUMENTS

| | | |
|---|---|---|
| 57-6579 | 1/1982 | Japan . |
| 57-9277 | 1/1982 | Japan . |
| 63-123107 | 5/1988 | Japan . |
| 63-273115 | 11/1988 | Japan . |
| 1-244512 | 9/1989 | Japan . |
| 2-12507 | 1/1990 | Japan . |
| 3-92911 | 4/1991 | Japan . |
| 4-184512 | 7/1992 | Japan . |
| 4-233608 | 8/1992 | Japan . |

*Primary Examiner*—Robert E. Nappi
*Assistant Examiner*—Rita Leykin
*Attorney, Agent, or Firm*—Staas & Halsey LLP

[57] ABSTRACT

A servomotor control method capable of preventing an overshoot in positioning a movable part of a machine in the case where the position of the movable part is controlled in a full-closed loop. When an output P1 of a first acceleration/deceleration processing section of a bell-type acceleration/deceleration process becomes "0", a coefficient k3 of incomplete integration is set to a relatively small value α, and a torque limit value TL is set to a relatively small value TLL. The incomplete integration is performed with the coefficient k3 set to the small value, and a torque command TC is limited to the small value, so that an output of the servomotor is reduced and torsion of a mechanical system between the servomotor and the mechanical movable part is canceled. When both the outputs P1 and P2 of the acceleration/deceleration processing sections become "0", the coefficient k3 is set to a relatively large value β, and a torque limit value is made larger, to perform the incomplete integration. Then, the output torque of the servomotor is increased gradually to position the movable part at the designated position.

18 Claims, 4 Drawing Sheets

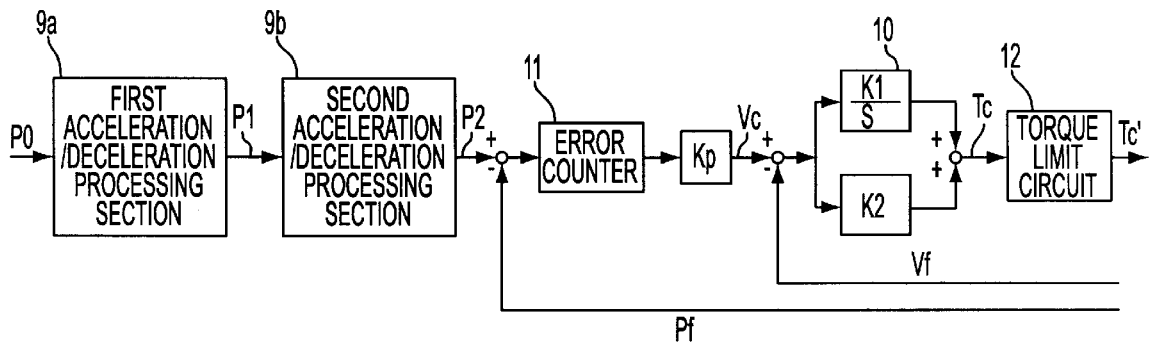
FIG. 3
FIG. 4a P0
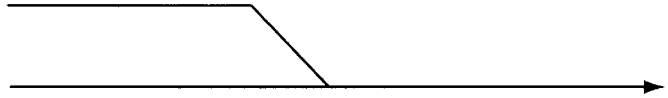
FIG. 4b P1
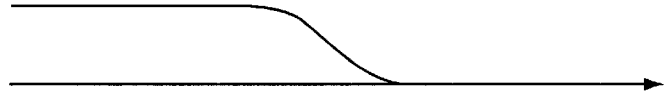
FIG. 4c P2
FIG. 4d OUTPUT OF INTEGRATOR
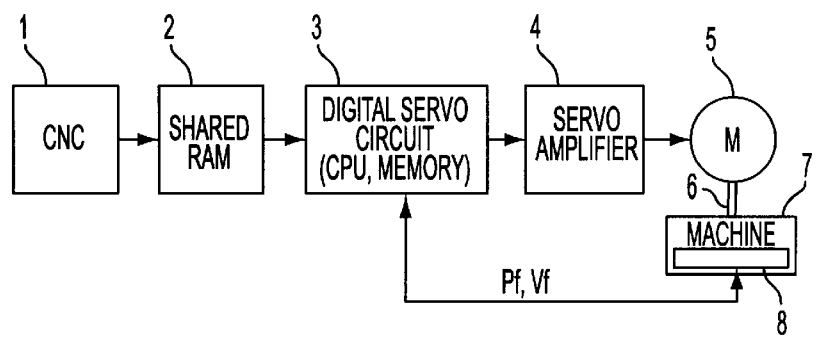
FIG. 5

METHOD OF AND APPARATUS FOR CONTROLLING A SERVOMOTOR

TECHNICAL FIELD

The present invention relates to a method of controlling a servomotor for driving a feed shaft of a machine tool, etc., and more specifically, to a servomotor control method for preventing an overshoot during a positional feedback control in which the position of a movable part driven by the feed shaft is detected by a position detector such as a scale detector.

BACKGROUND ART

In positioning control of a feed shaft of a machine tool and the like using a servomotor, according to a conventional method for preventing an overshoot during positioning, the output torque of a servomotor is reduced by decreasing a value of an integrator in a velocity loop when a position deviation becomes close to "0" (i.e., a movable part of the machine comes close to a commanded position), to thereby reduce the overshoot.

However, in a full-closed loop control, the position of the movable part driven by the feed shaft is detected by a position detector such as a scale detector for performing a positional feedback control based on the detected position. Further, in a case of such control a mechanical system between the servomotor and the position detector such as a scale detector may have an insufficient rigidity. If so, then the servomotor will, due to the torsion of the mechanical system, advance too much by an amount corresponding to the torsion at the time when the position deviation has become close to "0" and the movable part has reached the commanded position. That is, when the rigidity of the mechanical system between the servomotor and the position detector is insufficient, the movable part is driven while the mechanical system is distorted. The result is that, when the position is detected by the position detector as being the commanded position, the servomotor actually takes a position which makes the movable part to advance beyond the commanded target position by the amount corresponding to the torsion of the mechanical system. When the position deviation becomes "0" and the positioning is completed to stop the rotation of the servomotor, the torsion of the mechanical system is released gradually, causing the mechanical movable part to move further forward by the amount corresponding to the torsion of the mechanical system (in the same direction as it has been moving), thereby to overshoot the commanded target position. As the movable part of the machine moves forward, the position deviation increases. Therefore, in order to cancel the increase in the position deviation, the servomotor moves in the opposite direction, so that the movable part is positioned at the commanded target position. Thus, in the full-closed loop positional control, the movable part tends to overshoot the commanded position due to the torsion of the movable part.

SUMMARY OF THE INVENTION

An object of the present invention is to prevent an overshoot of a movable part of a machine or to reduce an overshooting amount when positional control is performed in a full-closed loop.

A servomotor control method of the present invention comprises the steps of: detecting a position of a movable part of a machine, which is driven by a servomotor through a mechanical system; controlling a position of the movable part using a motion command distributed from a numerical control device and the detected position of the movable part by a feedback control system including a position loop; and positioning the movable part so that torsion of the mechanical system between the servomotor and the movable part is released by reducing a torque command for the servomotor for a period immediately before termination of the motion command inputted to the position loop.

In the case where the motion command distributed from the numerical control device is subjected to the acceleration/deceleration process by an acceleration/deceleration processing section and then inputted to the position loop, the torque command for the servomotor is reduced when an input to the acceleration/deceleration processing section becomes zero. In the case where the acceleration/deceleration processing section is of a bell type composed of first and second acceleration/deceleration processing sections, the torque command for the servomotor is reduced when an output of the first acceleration/deceleration processing section becomes zero. In the case where the acceleration/deceleration process is not performed on the motion command distributed from the numerical control device, a signal indicating that it is time immediately before termination of the motion command is delivered at a predetermined time before the motion command terminates or when the remaining amount of the motion command becomes a predetermined value or smaller, and the torque command for the servomotor is reduced when the signal is delivered.

In order to reduce the torque command, the value of an integrator in a velocity loop of the feedback control system is decreased and/or a torque limit value of a torque limit circuit for limiting the torque command is decreased. In order to decrease the value of the integrator, an integral value for the present processing period of the position and velocity feedback control is obtained using a product of an integral value in the last processing period and a predetermined constant which is equal to or larger than 0 but smaller than 1. This means that the integration performed in the velocity loop is changed to an incomplete integration. Then, after the motion command is wholly inputted to the position loop, the predetermined constant is changed to a value which is larger than the predetermined value but smaller than 1, to thereby gradually increase the torque command.

BRIEF DESCRIPTION OF DRAWINGS

FIG. 3 is a block diagram showing essential elements of a servo control system for performing a servomotor control method according to the first embodiment of the present invention;

FIGS. 4a through 4d are diagrams showing relation among a motion command, outputs of acceleration/deceleration processing and an output of an integrator according to the first embodiment;

FIG. 5 is a block diagram of control hardware for performing the present invention;

DETAILED DESCRIPTION OF THE INVENTION

Figure 1:
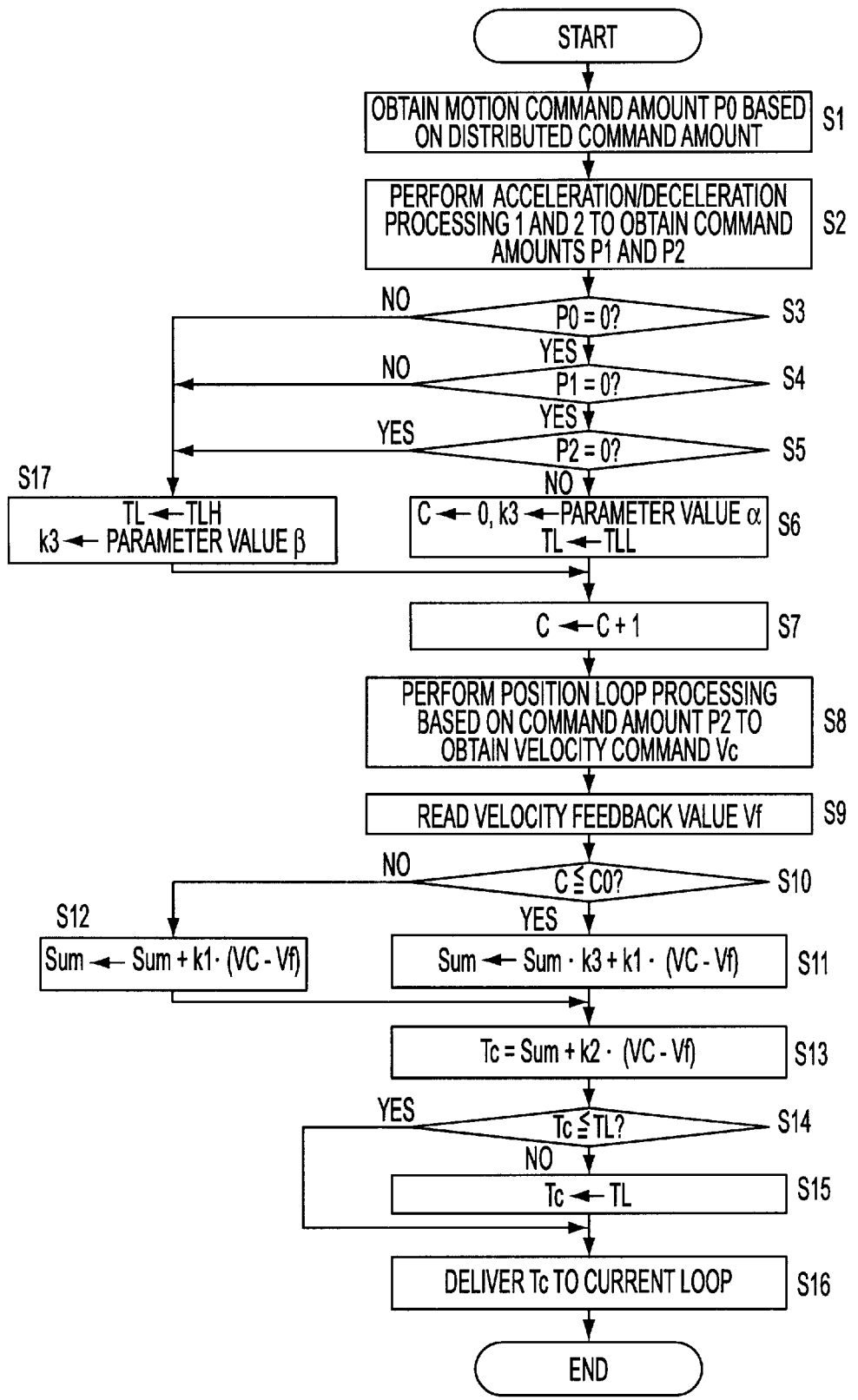
FIG. 1 is a flowchart of processing to be performed in each period of position and velocity loop processing according to a first embodiment of the present invention.

FIG. 3 is a block diagram showing essential elements of a servo control system according to a first embodiment of the present invention. In this embodiment, a bell-type acceleration/deceleration process is composed of two linear acceleration/deceleration processing sections. That first and second acceleration/deceleration processing sections, is 9a and 9b are adopted for the acceleration/deceleration processing. A motion command P0 distributed from a control device such as a CNC (computerized numerical control) device is inputted to the first acceleration/deceleration processing section 9a. An output P1 of the first acceleration/deceleration processing section 9a is inputted to the second acceleration/deceleration processing section 9b to obtain an output P2 of the second processing section 9b. The output P2 of the second acceleration/deceleration processing section 9b, which serves as a motion command for a position loop processing, is inputted in an error counter 11 for addition. Meanwhile a position feedback value Pf from a detector, such as a scale attached to a movable part of the machine, is inputted to the error counter 11 for subtraction, whereby a position deviation is obtained. The position deviation stored in the error counter 11 is multiplied by a position loop gain Kp to obtain a velocity command Vc, and a velocity feedback value Vf from a detector, such as a scale, is subtracted from the velocity command Vc to obtain a velocity deviation. Then, the product of a value obtained by integrating the velocity deviation by an integrator 10 and an integral gain k1 is added to the product of the velocity deviation and a proportional gain to obtain a torque command Tc, thereby executing PI (proportional-plus-integral) controlled velocity loop processing. The torque command Tc obtained by the velocity loop process is delivered, through a torque limit circuit 12 and as a torque command Tc' not exceeding a predetermined value, to an electric current loop to perform a current loop process (not shown) to drive a servomotor and thereby drive the mechanical movable part.

The servo control process of the present embodiment, as so far described is substantively the same as that of conventional systems. However, the present embodiment differs from the conventional system in that the value in the integrator 10 is reduced for a period immediately before the motion command inputted to the error counter 11 becomes "0". In the present embodiment, when the motion command P1 outputted from the first acceleration/deceleration processing section becomes "0", the integration to be performed in the integrator 10 is changed to incomplete integration, so that a coefficient of a smaller value can be used (from 0 to a value less than 1). Then, when the output P2 of the second acceleration/deceleration processing section 9b becomes "0", the coefficient for the incomplete integration in the integrator 10 is changed to a slightly larger value, and after a predetermined time has passed the normal integration is resumed. Further, when the output P1 of the first acceleration/deceleration processing section becomes "0", a torque limit value for the torque limit circuit 12 is changed to a smaller value, and when the output P2 of the second acceleration/deceleration processing section becomes "0", the torque limit value is changed back to a normal, larger value.

FIGS. 4a through 4d are time charts respectively showing states of the input and output of the first and second acceleration/deceleration processing sections 9a and 9b and a state of the integrator 10 in the positioning control. When the distributed motion amount P0 outputted from a host control device comes to an end (see FIG. 4a), the output P1 of the first acceleration/deceleration processing section 9a decreases linearly (see FIG. 4b). The output P1 of the first acceleration/deceleration processing section 9a is inputted to the second acceleration/deceleration processing section 9b, and the output P2 of the second acceleration/deceleration processing section 9b decreases smoothly as shown in FIG. 4c. The integrator 10 performs a normal integration while the output P1 of the first acceleration/deceleration processing section is not "0". However, when the output P1 becomes "0", the integrator 10 shifts to an incomplete integration so that an integral value close to "0" is outputted. When the output P2 of the second acceleration/deceleration processing section 9b becomes "0", the integrator 10 starts to slightly increase the coefficient of the incomplete integration, to thereby gradually increase the output (see FIG. 4d).

As is understood from the above, in the positioning control, while the motion command is maintained, the output of the integrator 10 is set to a small value, to thereby decrease a value of the torque command Tc. Further, the torque command Tc is limited to a small value by the torque limit circuit 12. Thus, the output torque of the servomotor is decreased so that the torsion of the mechanical system between the servomotor and the mechanical movable part is released. When the value of position deviation stored in the error counter 11 becomes nearly "0" to complete the positioning, the torsion of the mechanical system has almost been vanished, so that the mechanical movable part is positioned at a commanded position without overshooting.

FIG. 5 is a block diagram showing essential elements of a drive control system for a servomotor of a machine tool and the like for performing the present embodiment. In FIG. 5, a computerized numerical control (CNC) device 1, provided as a control device for controlling a machine tool and the like, distributes a motion command to each feed shaft of the machine tool and the like according to an operation program and the like. A shared RAM 2 is provided for mediating information between a processor of the CNC 1 and a processor of a digital servo circuit 3, delivers, on one hand, data such as a motion command written by the CNC 1 to the processor of the digital servo circuit 3. On the other hand, the RAM 2 delivers alarm information and the like written by the processor of the digital servo circuit 3 to the host processor of the CNC 1. The digital servo circuit 3, in the form of a digital signal processor (DSP), includes a processor, a ROM, a RAM, etc., and controls the servomotor of each feed shaft of the machine tool and the like. Reference numeral 4 designates a servo amplifier in the form of a transistor inverter, and reference numeral 5 designates a servomotor. To a mechanical movable part 7, which is driven by the servomotor 5 through a feed shaft 6, is attached a position and velocity detector 8, such as a scale and the like. A signal from the position and velocity detector 8 (information of position Pf and velocity Vf) is fed back to the digital servo circuit 3. Since the structure of the control system shown in FIG. 5 is the same as that of conventional servo control systems which perform control in the full-closed loop mode, details are omitted.

FIG. 1 is a flowchart of processing to be performed by the processor of the digital servo circuit 3 in each period of position and velocity loop processing according to the present embodiment.

The processor of the digital servo circuit 3 reads the distributed motion command amount supplied from the CNC 1 through the shared RAM 2, obtains the command amount P0 in each period of position and velocity loop processing (Step S1), and performs a bell-type acceleration/deceleration processing similar to that of conventional cases. That is, the processing by the first acceleration/deceleration processing section is performed based on the motion command amount P0 to output the command amount P1, and then the processing by the second acceleration/deceleration processing section is performed using the command amount P1 to obtain the command amount P2 (Step S2). Then, it is determined whether or not each command amount P0, P1 and P2 is "0" (Steps S3 through S5). If no motion command is outputted from the CNC 1 and thus the distributed motion command amount is "0", all the command amounts P0, P1 and P2 are "0". Therefore, after processings of Steps S3, S4 and S5 are performed, the control proceeds to Step S17, where the torque limit value TL is set to a normal limit value (high-level value) TLH and a coefficient k3 of incomplete integration (described later) is set to a predetermined parameter value β. Then, the control proceeds to Step S7. At Step S7, "1" is added to a counter C. The counter C is set to the countable maximum value at the time of its initialization, performed when the power is turned on, and is designed so that, when it counts to that maximum value, it keeps that value instead of counting up.

Next, the position deviation is obtained based on the command amount P2 outputted from the second acceleration/deceleration processing section and a position feedback signal Pf from the scale 8. The position loop processing is performed in a manner similar to conventional cases, to thereby obtain a velocity command Vc. Further, a velocity feedback value Vf, supplied from the scale 8, is read (Step S9), and it is determined whether or not the counter C shows a value not exceeding a predetermined value C0 (Step S10). As described above, when the power is turned on, the counter C is set to the maximum value, so that the value of the counter C is larger than the predetermined value C0. Therefore, the procedure proceeds from Step S10 to Step S12, and processing of the integrator 10 is performed. That is, a complete integration is performed in a manner that the velocity deviation, the value obtained by subtracting the velocity feedback value Vf read at Step S9 from the velocity command Vc obtained at Step S8, is multiplied by the integral gain k1, and the product is added to the integral value Sum, stored in the register. Then, the product of the velocity deviation (Vc–Vf) and the proportional gain k2 is added to the integral value Sum to obtain a torque command Tc (Step S13). Next, it is determined whether or not the torque command Tc exceeds the predetermined torque limit value TL (Step S14). If the torque command Tc does not exceed the torque limit value TL, the torque command Tc is delivered to the current loop (Step S16). If the torque command Tc exceeds the torque limit value TL, the value of torque command Tc is replaced by the torque limit value TL (Step S15) and delivered to the current loop, to bring the processing for the present period of position and velocity loop processing to an end.

When the distributed motion command amount is not outputted from the CNC 1, the processing of Steps S1 through S5, S17, S7 through S10 and S12 through S16 is performed repeatedly in each period.

When the distributed motion command amount is outputted from the CNC 1, the procedure proceeds to Step S17 after performing the processing of Steps S1 through S3. The processing of Steps S7 through S10 and Steps S12 through 16 is then preformed as described above, to end the position and velocity loop processing for the present period.

Thereafter, the processing of Steps S1 through S3, S17 and S7 through S16 is performed in each period. When the output of the distributed motion command amount from the CNC 1 ends, and the motion command amount P0 becomes "0", the procedure proceeds from Step S3 to Step S4 to determine whether or not the output P1 of the first acceleration/deceleration processing section is "0". If the output P1 is not "0", the processing of Step S17 and Step S7 and downward as described above is performed. When the output P1 of the first acceleration/deceleration processing section becomes "0", the procedure proceeds from Step S4 to Step S5 to determine whether or not the command amount P2, which is the output of the second acceleration/deceleration processing section, is "0". Since the command amount P2 is at first not "0", the procedure proceeds from Step S5 to Step S6, where the counter C is reset to "0" and the coefficient k3 of incomplete integration is set to a predetermined parameter value α. Further, the torque limit value TL is set to a lower-level value TLL, which is so determined as to release and remove the torsion of the mechanical system which has occurred when positioning is completed. Here, the predetermined values TLL and TLH, to which the torque limit value TL is selectively set, have the relation of TLL<TLH, and the parameter values α and β, to which the coefficient k3 of incomplete integration is selectively set, have the relation of $0 \leq \alpha < \beta < 1$.

After the processing of Step S6 is performed, the processing of Step S7 and the subsequent steps is performed. Here, since the counter C is reset to "0", the set value in the counter C is determined to be less than the set value C0 at Step S10, so that the control proceeds to Step S11, and the incomplete integration is performed. That is, to obtain the integral value sum of the present period, the product of the velocity deviation (Vc–Vf) and the integral gain k1 is added to the product of the integral value Sum, which is stored in the register, and the coefficient k3, which is set to α at Step S6. The parameter value α is predetermined to be among small values including "0". For example, if the α is predetermined to be "0", the integral value Sum of the present period is [k1(Vc–Vf)], which is a very small value. Thus, as shown in FIG. 4d, the integral value is very small in the section where the output P1 of the first acceleration/deceleration processing section is "0" and the output P2 of the second acceleration/deceleration processing section is not "0".

Then the product of the velocity deviation (Vc–Vf) and the integral gain k1 is added to the integral value Sum as described above, to thereby obtain a torque command Tc (Step S13). In other words, the torque command Tc is obtained by the velocity loop processing based on the incomplete integration, so that it has a small value. Further, in the present embodiment, the torque limit value TL is set to the low-level value TLL at Step S6, so that the value of torque command Tc obtained at Step S13 exceeds the torque limit value TL (=TLL) when compared in Step S14. The torque command Tc is then limited to that torque limit value TL (=TLL) (Step S15). If the value of torque command Tc does not exceed the torque limit value TL, the torque command Tc obtained at Step S13 is delivered, directly as it is, to the current loop (Step S16).

Thereafter, while the commanded amount P1, which is the output of the first acceleration/deceleration processing section, is "0", and the commanded amount P2 from the second acceleration/deceleration processing section is not "0", (that is, while the motion amount is not accumulated in the first acceleration/deceleration processing section but the motion amount is still accumulated in the second acceleration/deceleration processing section), the counter C is set to "0", the coefficient k3 is set to a small value a and the torque limit value TL is set to a low-level value TLL at Step S6. Therefore, the control proceeds from Step S10 to Step S11, where the incomplete integration is performed to obtain the torque command Tc. Further, since the torque command Tc is limited to the value not exceeding the torque limit value TL, which is set to the low-level toque limit value TLL, the output torque of the servomotor is made small. Thereby, the torsion of the mechanical system, such as the feed shaft 6 which lies between the servomotor 5 and the mechanical movable part 7, is gradually canceled.

Then, when the commanded amount P2 from the second acceleration/deceleration processing section also becomes "0", the control proceeds from Step S5 to Step S17, where the torque limit value TL is set to a high-level normal value TLH, and the coefficient k3 of the incomplete integration is set to β (Step S17). Then, the processing of Step S7 and the following steps is performed in each period. In this case, since the processing of Step S6 is skipped, the counter C is counted up in each period, and while the value of the counter C does not exceed the predetermined value C0, the control proceeds from Step S10 to Step S11, where the incomplete integration is performed with the coefficient k3 set to β.

As described above, while the output P1 of the first acceleration/deceleration processing section is "0" and the output P2 of the second acceleration/deceleration processing section is not "0", the torque command Tc takes a small value so that the output torque of the servomotor 5 is small. Therefore, the servomotor 5 can not follow up the motion command, causing the position deviation in the error counter 11 to increase. Therefore, the velocity command Vc corresponding to the position deviation is obtained at Step S8, and the velocity loop processing is performed based on the obtained velocity command Vc. Since the integration performed in that velocity loop processing is the incomplete integration in Step S11, the integral value Sum increases by a small amount, that is, increases gradually. As a result, the torque command value Tc also increases gradually, so that the position deviation stored in the error counter 11 diminishes gradually, and the mechanical movable part 7 moves to the designated target position.

When the value of the counter C exceeds the predetermined value C0, the control proceeds from Step S10 to Step S12, where the normal, complete integration is performed. Thereafter, the processings of Steps S1 through S5, S17, S7 through S10, S12 and S13 through S16 are performed in each period to complete the positioning to the commanded position. When a new motion command is outputted from the CNC 1, the processing as described above is performed again.

In the present embodiment, the bell-type acceleration/deceleration processing is adopted as the acceleration/deceleration processing. Utilizing the outputs of the first and second acceleration/deceleration processing sections 9a and 9b, the point at which the output P1 of the first acceleration/deceleration processing section 9a becomes "0" and the output P2 of the second acceleration/deceleration processing section 9b is not "0", is made to be recognized to be the point slightly before the end of the motion command. In order to decrease the output torque of the servomotor from that time on, the coefficient k3 of the incomplete integration is changed to a smaller value (for example, "0"), and the torque limit value TL is also made smaller. By doing so, the output torque of the servomotor 5 is diminished, and the resulting state is kept while the output P1 of the first acceleration/deceleration processing section 9a is "0" and the output P2 of the second acceleration/deceleration processing section 9b is not "0". The torsion of the mechanical system is thereby cancelled. After both outputs P1 and P2 of the first and second acceleration/deceleration processing sections 9a and 9b become "0", and the output of the motion command to the servo control processing (circuit) is completed, the incomplete integration is performed during a predetermined time (a time determined by the predetermined value C0) with the coefficient k3 made a little larger. Thereby, the output torque of the servomotor is prevented from increasing too rapidly, preventing torsion or shocks from occurring to the mechanical system.

In the case in which the bell-type acceleration/deceleration processing is not employed, but the normal acceleration/deceleration processing (having only one stage thereof) is performed, the output torque of the servomotor is diminished from the point at which the input of the acceleration/deceleration processing is "0" and the output thereof is not "0". When the output of the acceleration/deceleration processing becomes "0", the incomplete integration with a little larger coefficient k3 is preformed until a time determined by the predetermined value C0 has passed. That is, in the flowchart of FIG. 1, acceleration/deceleration processing of only one stage is performed in Step S2, and, using the obtained output, for example, as P2, the control proceeds from Step S3 to Step S5 skipping Step S4.

Figure 2:
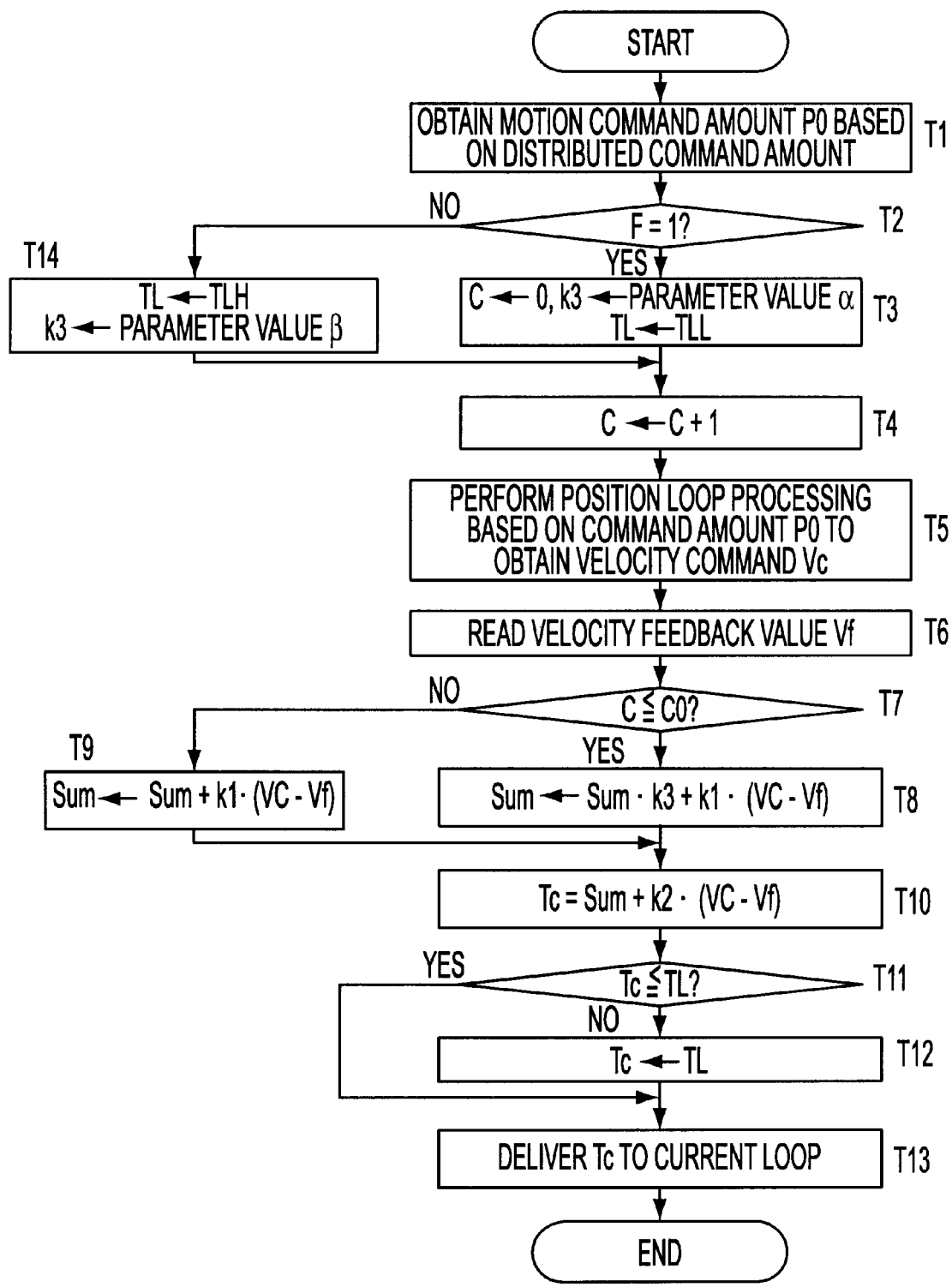
FIG. 2 is a flowchart of processing to be performed in each period of position and velocity loop processing according to a second embodiment of the present invention.

Further, the present invention is applicable either to the case in which the acceleration/deceleration processing is not performed or to the case in which the acceleration/deceleration processing is performed but the input and output thereof are not utilized. An example of such cases is shown by the flowchart of FIG. 2. Since the example shown in FIG. 2 is the case in which the acceleration/deceleration processing is not performed, the processing of Step S2 in FIG. 1 is not included. The processing of Step S1 in FIG. 1 corresponds to and is the same as the processing of Step T1 in FIG. 2. The processings of Steps S3 through S5 in FIG. 1 correspond to the processing of Step T2 in FIG. 2, though they are different only with respect to this point. The processing of Step S6 in FIG. 1 corresponds to and is the same as the processing of Step T3 in FIG. 2, and the processing of Step S17 in FIG. 1 is the same as the processing of Step T14 in FIG. 2. Further, the processing of Step S7 and downward in FIG. 1 corresponds to and is the same as the processing of Step T4 and downward in FIG. 2.

In this embodiment, the CNC 1 sets a flag F to "1", at a predetermined number of periods before the distribution of the motion command is completed, and sets the flag F to "0" when the distribution is completed. When the CNC 1 reads the command velocity and the motion command amount from an operation program, the number of distribution periods through which the motion command amount is to be outputted is calculated. Thus, the period in which the distribution of the motion command is completed can be known, and the period which is a predetermined number of periods before the period in which the distribution is completed can be also known. Thus, when that period comes, the flag F is set up. Alternatively, the point at which the flag F is to be set up can be determined based on the remainder of the motion command amount. Further, a reference value for remainder of the motion amount may be predetermined so that when the remainder of the motion command amount has become smaller than the reference value while the CNC outputs the motion command in each distribution period, the flag F is set up.

The motion command P0 in the position and velocity loop processing period is obtained based on the motion command amount distributed by the CNC 1 (Step T1). Then, it is determined whether or not the flag F is set to "1" in the shared RAM (Step S2), and if the flag is not set to "1", the procedure proceeds to Step T14, where the torque limit value TL is set to the normal high-level value TLH, and the coefficient k3 of the incomplete integration is set to β, which is the same processing as in Step S17 in FIG. 1. Then the processing of Step T4 and subsequent steps, which are the same as the processing of Step S7 and subsequent steps in FIG. 1, is performed. Then, when the processing progresses to a point, which is a predetermined number of periods before the period at which the distribution of the motion command is completed, the flag F is set to "1". When the flag F set to "1" is detected in Step T2, the procedure proceeds to Step T3, where the same processing as that of Step S6 in FIG. 1 is performed. That is, the counter C is reset to "0", the coefficient k3 of the incomplete integration is set to α, and the torque limit value TL is set to the low-level value TLL. Then, the processing of Step T4 and the subsequent steps is performed. In the period, which is a predetermined number of periods before the period in which the distribution of the motion command is completed, the incomplete integration at Step T10 is performed with such coefficient k3 of the incomplete integration that is set to a small parameter value α (for example, "0"), to thereby keep the integral value Sum at a small value. Further, the torque command Tc is limited to the low-level torque limit value TLL or under (Steps T11 and T12) to thereby drive the servomotor. Therefore, the output torque of the servomotor 5 is kept at a low level, whereby the torsion of the mechanical system (6) is canceled. When the distribution of the motion amount is completed, and the flag F is set to "0", the torque limit value TLH, is reset to the normal, high-level value TLH and the coefficient of the incomplete integration is set to β (Step T14). Thus, the incomplete integration is performed with the coefficient k3 until the value of the counter C exceeds the predetermined value C0 (Step T8), so that the output torque of the servomotor 5 is increased gradually, avoiding a rapid increase in the output torque. When the value of the counter C exceeds the predetermined value C0, the normal complete integration is performed (Step T9) to position the mechanical movable part 7 at the commanded position.

In the above described two embodiments, the output torque of the servomotor is decreased by decreasing the integral value obtained by integration in the velocity loop and by also limiting the value of the torque command to a value smaller than the torque limit value. The output torque of the servomotor may, however, be decreased either by decreasing the integral value or by decreasing torque limit value to a smaller value. In the case in which the output torque of the servomotor is decreased only by the torque limit value, the torque limit value is reduced to a smaller value from the point, which is a predetermined time before the point at which the whole motion command has been inputted in the servo control system (servo circuit)(the whole motion command has been inputted in the error counter 11), until the point at which the input of the whole motion command is completed. After the input of the whole motion command is completed, the torque limit value is increased to a little larger value or is increased gradually, before a predetermined time (predetermined value C0) has passed. When the predetermined time has passed, the torque limit value is reset to a normal large torque limit value.

Figure 6:
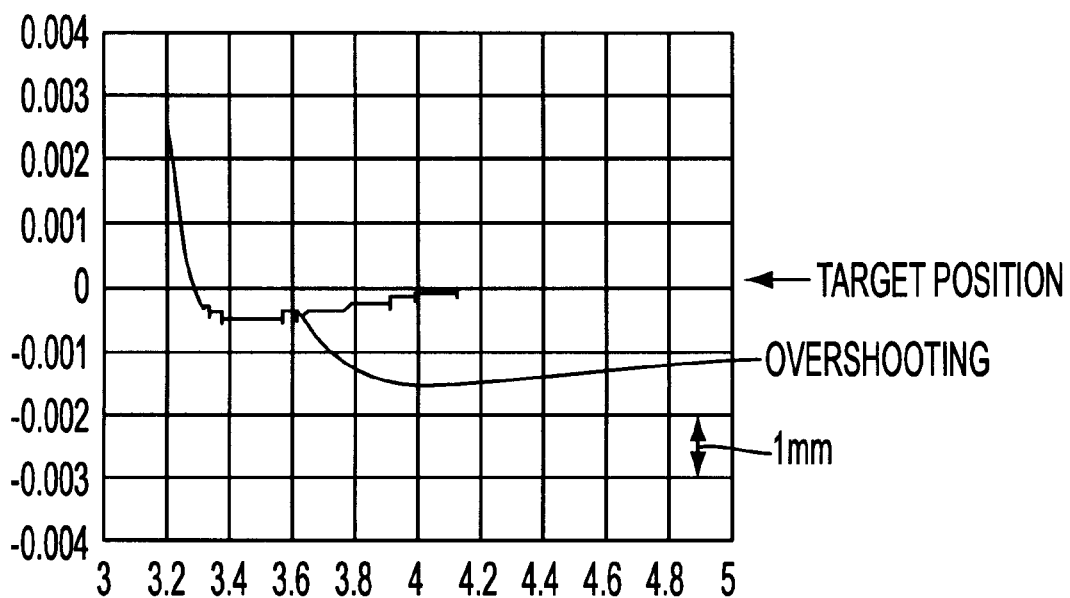
FIG. 6 is a graph showing a result of an experiment on positioning control according to a conventional method.
Figure 7:
FIG. 7 is a graph showing a result of an experiment on positioning control according to the present invention.

FIGS. 6 and 7 show the result of an experiment performed for verifying the effect of the present invention. FIG. 6 shows the result of an experiment wherein the positioning is performed not by applying the present invention but by a conventional method FIG. 7 shows the result of an experiment wherein the positioning is performed by applying the first embodiment of the present invention. In FIGS. 6 and 7, the abscissa represents time, the ordinate represents the position of the mechanical movable part, wherein "0" represents the target position, and the feed velocity is set to 10 mm/min. In FIG. 7, the time constant of the acceleration/deceleration processing section is set to 64 ms, that of the first acceleration/deceleration processing section and that of second acceleration/deceleration processing section being 32 ms respectively.

In the case of FIG. 6, where the conventional method is used, overshooting of 0.6 mm or so occurs, while in the case of FIG. 7 where the present invention is applied, overshooting is only 0.2 mm or so, thereby indicating that overshooting can be reduced by the present invention.

According to the present invention, when the position of a mechanical movable part is controlled in a full-closed loop, the positioning is performed in a manner that the torsion of a mechanical system such as a feed shaft between the servomotor and the mechanical movable part can be reduced. Therefore, overshooting can be prevented or reduced.

We claim:

1. A method of controlling a servomotor for driving a movable part of a machine through a mechanical system, based on a first motion command distributed from a numerical control device, the method comprising the steps of:

detecting a position of the movable part;

controlling a position of the movable part using the first motion command and the position of the movable part detected in the detecting step by a feedback control system including a position loop; and positioning the movable part so that torsion of the mechanical system between the servomotor and the movable part is released by reducing a torque command for the servomotor for a period immediately before termination of a second motion command input to the position loop, the period commencing upon occurrence of a predetermined indication preceding termination of the second motion command.

2. A method of controlling a servomotor according to claim 1, wherein:

the feedback control system comprises an acceleration/deceleration processing section, the controlling step includes the steps of:
performing an acceleration/deceleration process of the first motion command by the acceleration/deceleration processing section; and
outputting the motion command obtained by the acceleration/deceleration process in the acceleration/deceleration process step to the position loop as the second motion command, and the positioning step includes a step of reducing the torque command for the servomotor when an input to the acceleration/deceleration processing section becomes zero.

3. A method of controlling a servomotor for driving a movable part of a machine through a mechanical system, based on a first motion command distributed from a numerical control device, the method comprising the steps of:

detecting a position of the movable part;

controlling a position of the movable part using the first motion command and the position of the movable part detected in the detecting step by a feedback control system including a position loop; and positioning the movable part so that torsion of the mechanical system between the servomotor and the movable part is released by reducing a torque command for the servomotor for a period immediately before termination of a second motion command input to the position loop, the period commencing upon occurrence of a predetermined indication preceding termination of the second motion command;

wherein:

the feedback control system comprises a first acceleration/deceleration processing section and a second acceleration/deceleration processing section; and the controlling step includes the steps of:
performing an acceleration/deceleration process of the first motion command by the first acceleration/-deceleration processing section and further performing an acceleration/deceleration process by the second acceleration/deceleration processing section, and
outputting the motion command obtained by the acceleration/-deceleration processes in the acceleration/deceleration process step to the position loop as the second command; and the positioning step includes the step of reducing the torque command for the servomotor when an output of the first acceleration/deceleration processing section becomes zero.

4. A method of controlling a servomotor for driving a movable part of a machine through a mechanical system, based on a first motion command distributed from a numerical control device, the method comprising the steps of:

detecting a position of the movable part;

controlling a position of the movable part using the first motion command and the position of the movable part detected in the detecting step by a feedback control system including a position loop;

positioning the movable part so that torsion of the mechanical system between the servomotor and the movable part is released by reducing a torque command for the servomotor for a period immediately before termination of a second motion command input to the position loop, the period commencing upon occurrence of a predetermined indication preceding termination of the second motion command; and delivering a predetermined signal at a predetermined time before the second motion command terminates;

wherein the positioning step includes a step of reducing the torque command for the servomotor when the predetermined signal is delivered.

5. A method of controlling a servomotor for driving a movable part of a machine through a mechanical system, based on a first motion command distributed from a numerical control device, the method comprising the steps of:

detecting a position of the movable part;

controlling a position of the movable part using the first motion command and the position of the movable part detected in the detecting step by a feedback control system including a position loop;

positioning the movable part so that torsion of the mechanical system between the servomotor and the movable part is released by reducing a torque command for the servomotor for a period immediately before termination of a second motion command input to the position loop, the period commencing upon occurrence of a predetermined indication preceding termination of the second motion command; and delivering a signal indicating a time immediately before termination of the first motion command when the remainder of the first motion command amount is not greater than a predetermined value;

wherein the positioning step includes a step of reducing the torque command for the servomotor when the signal is delivered.

6. A method of controlling a servomotor for driving a movable part of a machine through a mechanical system, based on a first motion command distributed from a numerical control device, the method comprising the steps of:

detecting a position of the movable part;

controlling a position of the movable part using the first motion command and the position of the movable part detected in the detecting step by a feedback control system including a position loop; and positioning the movable part so that torsion of the mechanical system between the servomotor and the movable part is released by reducing a torque command for the servomotor for a period immediately before termination of a second motion command input to the position loop, the period commencing upon occurrence of a predetermined indication preceding termination of the second motion command;

wherein the feedback control system includes a velocity loop and the positioning step includes the step of reducing the torque command by decreasing a value of an integrator in the velocity loop.

7. A method of controlling a servomotor according to claim 6, wherein the positioning step includes the step of obtaining an integral value for the present processing period of a position and velocity feedback control using a product of an integral value in the last processing period and a predetermined constant which is equal to or larger than 0 but smaller than 1.

8. A method of controlling a servomotor according to claim 7, further comprising the step of gradually increasing the torque command by changing the predetermined constant to a value larger than a present value of the predetermined constant but smaller than 1 after the second motion command is wholly inputted to the position loop.

9. A method of controlling a servomotor for driving a movable part of a machine through a mechanical system, based on a first motion command distributed from a numerical control device, the method comprising the steps of:

detecting a position of the movable part;

controlling a position of the movable part using the first motion command and the position of the movable part detected in the detecting step by a feedback control system including a position loop; and positioning the movable part so that torsion of the mechanical system between the servomotor and the movable part is released by reducing a torque command for the servomotor for a period immediately before termination of a second motion command input to the position loop, the period commencing upon occurrence of a predetermined indication preceding termination of the second motion command;

wherein the feedback control system includes a torque limit circuit for limiting the torque command, and the positioning step includes the step of reducing the torque command by decreasing a limit value of the torque limit circuit.

10. A method of controlling a servomotor according to claim 1, wherein the predetermined indication is one of the first motion command, provided as an input signal to an acceleration/deceleration processing operation, becoming zero while an output signal thereof is nonzero, commencement of a predetermined time interval before termination of the second motion command, and a remaining amount of the second motion command becoming less than or equal to a predetermined value.

11. A method of controlling a servomotor according to claim 10, wherein the acceleration/deceleration processing operation is a second acceleration/deceleration processing operation subsequent to a first acceleration/deceleration processing operation, and the input signal to the second acceleration/deceleration processing operation is an output signal from the first acceleration/deceleration operation.

12. A servo control system for controlling a servomotor to drive a movable part of a machine through a mechanical system, based on a first motion command distributed from a numerical control device, said system comprising:

means for detecting a position of the movable part;

means, including a feedback control system including a position loop, for controlling a position of the movable part using the feedback control system and in accordance with the first motion command and the position of the movable part detected by said detecting means; and means for positioning the movable part so that torsion of the mechanical system between the servomotor and the movable part is released by reducing a torque command for the servomotor for a period immediately before termination of a second motion command input to the position loop, the period commencing upon occurrence of a predetermined indication preceding termination of the second motion command.

13. A servo control system according to claim 12, wherein:

the feedback control system further includes an acceleration/deceleration processing section for performing an acceleration/deceleration process of the first motion command to obtain the second motion command;

said controlling means further includes means for outputting the second motion command obtained by the acceleration/deceleration processing section to the position loop; and said positioning means includes means for reducing the torque command for the servomotor when an input to the acceleration/deceleration processing section becomes zero.

14. A servo control system according to claim 12, wherein:

the feedback control system further includes
a first acceleration/deceleration processing section for performing a first acceleration/deceleration process on the first motion command to generate a first output signal, and
a second acceleration/deceleration processing section for performing a second acceleration/deceleration process on the first output signal to generate a second output signal as the second motion command;

said controlling means further comprises means for outputting the second output signal to the position loop; and said positioning means includes means for reducing the torque command for the servomotor when the first output signal becomes zero.

15. A computer-readable medium encoded with a program for controlling a servomotor to drive a movable part of a machine through a mechanical system, based on a first motion command distributed from a numerical control device, said program comprising the functions of:

detecting a position of the movable part;

controlling a position of the movable part using a feedback control system including a position loop and in accordance with the first motion command and the position of the movable part detected by the detecting function; and positioning the movable part so that torsion of the mechanical system between the servomotor and the movable part is released by reducing a torque command for the servomotor for a period immediately before termination of a second motion command input to the position loop, the period commencing upon occurrence of a predetermined indication preceding termination of the second motion command.

16. A computer-readable medium according to claim 15, wherein:

the feedback control system further includes an acceleration/deceleration processing section for performing an acceleration/deceleration process of the first motion command to obtain the second motion command;

the controlling function includes a function for outputting the second motion command obtained by the acceleration/deceleration process of the acceleration/deceleration processing section to the position loop; and the positioning function includes a function for reducing the torque command for the servomotor when an input to the acceleration/deceleration processing section becomes zero.

17. A computer-readable medium according to claim 15, wherein:

the feedback control system further includes
a first acceleration/deceleration processing section for performing a first acceleration/deceleration process on the first motion command to generate a first output signal, and
a second acceleration/deceleration processing section for performing a second acceleration/deceleration process on the first output signal to generate a second output signal as the second motion command;

the controlling function further comprises a function for outputting the second output signal to the position loop; and the positioning function includes a function for reducing the torque command for the servomotor when the first output signal becomes zero.

18. A servomotor drive control system for controlling a servomotor to drive a movable part through a mechanical system coupled between the servomotor and the movable part, said servomotor drive control system comprising:

a numerical controller for distributing a first motion command for the servomotor; and a digital servo control circuit for receiving the first motion command, obtain therefrom a second motion command, and reducing a torque command for the servomotor for a period immediately before termination of the second motion command, the period commencing upon occurrence of a predetermined indication preceding termination of the second motion command;

whereby the movable part is positioned so that torsion of the mechanical system is released as the movable part is driven by the servomotor.

* * * * *